US010485245B2

(12) United States Patent
Ahmed (10) Patent No.: US 10,485,245 B2
(45) Date of Patent: Nov. 26, 2019

(54) OUTDOOR COOKER AND SMOKER, AND FUEL COMBUSTOR THEREFOR

(71) Applicant: W.C. BRADLEY CO., Columbus, GA (US)

(72) Inventor: Mallik Ahmed, Columbus, GA (US)

(73) Assignee: W.C. BRADLEY CO., Columbus, GA (US)

( * ) Notice: Subject to any disclaimer, the term of this patent is extended or adjusted under 35 U.S.C. 154(b) by 364 days.

(21) Appl. No.: 15/338,731

(22) Filed: Oct. 31, 2016

(65) Prior Publication Data

US 2017/0042168 A1 Feb. 16, 2017

Related U.S. Application Data

(62) Division of application No. 14/305,718, filed on Jun. 16, 2014, now Pat. No. 9,510,604.

(60) Provisional application No. 61/835,737, filed on Jun. 17, 2013.

(51) Int. Cl.
| | |
|---|---|
| *A47J 37/07* | (2006.01) |
| *A23B 4/052* | (2006.01) |
| *A23L 5/10* | (2016.01) |
| *F24C 3/08* | (2006.01) |

(52) U.S. Cl.
CPC ............... *A23B 4/052* (2013.01); *A23L 5/10* (2016.08); *A47J 37/0704* (2013.01); *A47J 37/0713* (2013.01); *F24C 3/08* (2013.01); *A23V 2002/00* (2013.01)

(58) Field of Classification Search
CPC .............. A47J 37/07–0781; F24C 3/08; A23B 4/052–056
See application file for complete search history.

(56) References Cited

U.S. PATENT DOCUMENTS

| | | | |
|---|---|---|---|
| 1,158,986 | A | 11/1915 | Cronwall |
| 1,399,704 | A | 12/1921 | Eida |
| 2,001,615 | A | 5/1935 | William |
| 3,155,814 | A | 11/1964 | Appleman et al. |
| 3,245,458 | A | 4/1966 | Patrick et al. |

(Continued)

FOREIGN PATENT DOCUMENTS

| | | |
|---|---|---|
| CN | 1240910 | 1/2000 |
| DE | 10215 688 A1 | 6/2003 |

(Continued)

OTHER PUBLICATIONS

Char-Broil, "Assembly Instructions for Models 6320, 6321 & 6323"; 1992, pp. 1-18.

(Continued)

*Primary Examiner* — Michael A Laflame, Jr.
(74) *Attorney, Agent, or Firm* — Dennis D. Brown; Brown Patent Law, P.L.L.C.

(57) ABSTRACT

An apparatus for cooking or smoking and a fuel combustor therefor. In the cooking or smoking apparatus and method, combustion products produced by the combustor, by a gas burner, or by other means are preferably delivered upwardly through an upwardly extending inner flow gap which at least partially surrounds a cooking or smoking chamber. The combustion products are preferably then delivered downwardly through the cooking or smoking chamber and then upwardly through an upwardly extending outer flow gap which is outside of the inner flow gap and which also at least partially surrounds the cooking or smoking chamber.

4 Claims, 9 Drawing Sheets

(56) References Cited

U.S. PATENT DOCUMENTS

| | | |
|---|---|---|
| 3,277,948 A | 10/1966 | Best |
| 3,437,415 A | 4/1969 | Davis et al. |
| 3,561,902 A | 2/1971 | Best |
| 3,586,825 A | 6/1971 | Hurley |
| 3,663,798 A | 5/1972 | Speidel et al. |
| 3,683,058 A | 8/1972 | Partiot |
| 3,788,301 A | 1/1974 | Terry |
| 3,941,117 A | 3/1976 | Pei et al. |
| 3,971,308 A | 7/1976 | Parker |
| 4,024,839 A | 5/1977 | Reid, Jr. et al. |
| 4,039,275 A | 8/1977 | McGettrick |
| 4,057,670 A | 11/1977 | Scheidler |
| 4,140,100 A | 2/1979 | Ishihara |
| 4,207,456 A | 6/1980 | Best |
| 4,235,023 A | 11/1980 | Best |
| 4,276,869 A | 7/1981 | Kern |
| 4,321,857 A | 3/1982 | Best |
| 4,375,802 A | 3/1983 | Wallasvaara |
| 4,403,541 A | 9/1983 | Berger |
| 4,403,597 A | 9/1983 | Miller |
| 4,426,792 A | 1/1984 | Best |
| 4,437,833 A | 3/1984 | Mertz |
| 4,508,097 A | 4/1985 | Berg |
| 4,537,492 A | 8/1985 | Lein et al. |
| 4,546,553 A | 10/1985 | Best |
| 4,569,657 A | 2/1986 | Laspeyres |
| 4,575,616 A | 3/1986 | Bergendal |
| 4,606,261 A | 8/1986 | Bernardi |
| 4,715,356 A | 12/1987 | Reynolds |
| 4,766,876 A | 8/1988 | Henry et al. |
| 4,785,552 A | 11/1988 | Best |
| 4,798,192 A | 1/1989 | Maruko |
| 4,839,502 A | 6/1989 | Swanson et al. |
| 4,883,423 A | 11/1989 | Holowczenko |
| 4,886,044 A | 12/1989 | Best |
| 4,889,972 A | 12/1989 | Chang |
| 4,909,137 A | 3/1990 | Brugnoli |
| 4,960,977 A | 10/1990 | Alden |
| 4,979,436 A | 12/1990 | McGowan |
| 5,024,209 A | 6/1991 | Schaupert |
| 5,028,760 A | 7/1991 | Okuyama |
| 5,062,408 A | 11/1991 | Smith et al. |
| 5,062,788 A | 11/1991 | Best |
| 5,111,803 A | 5/1992 | Barker et al. |
| 5,218,952 A | 6/1993 | Neufeldt |
| 5,230,161 A | 7/1993 | Best |
| 5,240,411 A | 8/1993 | Abalos |
| 5,277,106 A | 1/1994 | Raymer et al. |
| 5,279,277 A | 1/1994 | Barker |
| 5,306,138 A | 4/1994 | Us |
| 5,313,877 A | 5/1994 | Holland |
| 5,320,086 A | 6/1994 | Beal et al. |
| 5,322,007 A | 6/1994 | Caridis et al. |
| 5,363,567 A | 11/1994 | Best |
| 5,488,897 A | 2/1996 | Snyder |
| 5,494,003 A | 2/1996 | Bartz et al. |
| 5,509,403 A | 4/1996 | Kahlke et al. |
| 5,513,623 A | 5/1996 | Hong |
| 5,566,607 A | 10/1996 | Schleimer |
| 5,567,459 A | 10/1996 | Gonzalez-Hernandez et al. |
| 5,571,009 A | 11/1996 | Stalhane et al. |
| 5,582,094 A | 12/1996 | Peterson et al. |
| 5,594,999 A | 1/1997 | Best |
| 5,599,471 A | 4/1997 | Zaidman |
| 5,676,043 A | 10/1997 | Best |
| 5,711,661 A | 1/1998 | Kushch et al. |
| 5,761,990 A | 6/1998 | Stewart et al. |
| 5,782,166 A | 7/1998 | Lin |
| 5,823,099 A | 10/1998 | Ko |
| 5,879,154 A | 3/1999 | Suchovsky |
| 5,890,422 A | 4/1999 | Clark et al. |
| 5,909,533 A | 6/1999 | Kitabayashi et al. |
| 5,989,013 A | 11/1999 | Gray |
| 6,114,666 A | 9/2000 | Best |
| 6,159,001 A | 12/2000 | Kushch et al. |
| 6,190,162 B1 | 2/2001 | Smith et al. |
| 6,205,996 B1 | 3/2001 | Ryan |
| 6,461,150 B1 | 10/2002 | Sirand |
| 6,657,168 B1 | 12/2003 | Lazzer |
| 6,761,160 B1 | 7/2004 | Haygood |
| 6,779,519 B2 | 8/2004 | Harneit |
| 6,783,226 B2 | 8/2004 | Szlucha |
| 7,202,447 B2 | 4/2007 | Kingdon et al. |
| 7,219,663 B2 | 5/2007 | Cuomo |
| 7,726,967 B2 | 6/2010 | Best |
| 8,074,634 B2 | 12/2011 | Best |
| 8,227,728 B2 | 7/2012 | Best |
| 9,510,604 B2 | 12/2016 | Ahmed |
| 2001/0036610 A1 | 11/2001 | Wood |
| 2002/0020405 A1 | 2/2002 | Coleman et al. |
| 2004/0011350 A1 | 1/2004 | Dowst et al. |
| 2004/0060552 A1 | 4/2004 | Yamada et al. |
| 2004/0152028 A1 | 8/2004 | Singh et al. |
| 2004/0250688 A1 | 12/2004 | Farkas et al. |
| 2005/0204934 A1 | 9/2005 | Robertson |
| 2005/0226976 A1 | 10/2005 | Chung |
| 2006/0003279 A1 | 1/2006 | Best |
| 2006/0021517 A1 | 2/2006 | Best |
| 2006/0042473 A1 | 3/2006 | Silvestrini |
| 2006/0266979 A1 | 11/2006 | Ra |
| 2007/0125357 A1 | 6/2007 | Johnston |
| 2007/0131234 A1 | 6/2007 | Moore |
| 2008/0072890 A1 | 3/2008 | Best |
| 2008/0121117 A1 | 5/2008 | Best |
| 2011/0186561 A1 | 8/2011 | Ahmed |
| 2012/0222665 A1 | 9/2012 | Ahmed |
| 2012/0318254 A1 | 12/2012 | Howard |
| 2013/0008427 A1 | 1/2013 | Ahmed |

FOREIGN PATENT DOCUMENTS

| | | |
|---|---|---|
| EP | 0 221 686 | 10/1986 |
| EP | 1 028 292 A1 | 8/2000 |
| EP | 1 096 203 | 5/2001 |
| FR | 1 129 123 | 1/1957 |
| FR | 1 204 968 | 1/1960 |
| FR | 1387132 | 1/1965 |
| FR | 70 02058 | 9/1971 |
| FR | 2076610 | 10/1971 |
| FR | 2472141 | 12/1980 |
| GB | 23552 | 3/1915 |
| GB | 432481 | 12/1933 |
| GB | 562136 | 6/1944 |
| GB | 576377 | 4/1946 |
| GB | 1029774 | 7/1963 |
| GB | 1339345 | 12/1973 |
| GB | 2 362 451 | 11/2001 |
| GB | 2 409 265 | 6/2005 |
| JP | 2000 121064 | 4/2000 |
| JP | 2004 179089 | 6/2004 |
| WO | WO 2004103133 A1 | 12/2004 |
| WO | WO 2006080949 A2 | 8/2006 |
| WO | WO 2008125258 A2 | 10/2008 |
| WO | 2014078132 | 5/2014 |

OTHER PUBLICATIONS

"Cross Section of G-Series Burner System"; Sep. 4, 2001; Publisher: Thermal Engineering Corp., Columbia, SC; Published in: US.

P. Sheridan, et al., "Application of Far Infra-Red Radiation to Cooking of Meat Products"; 1999; pp. 203-208, vol. 1, No. 3/4; Publisher: Journal of Food Engineering; Published in: US.

"Cross Section of G3000 Cabinet Unit"; Sep. 4, 2001; Publisher: Thermal Engineering Corp., Columbia, SC; Published in: US.

Sheridan, et al., "Analysis of Yield While Cooking Beefburger Patties Using Far Infrared Radiation"; 2002; pp. 3-11, vol. 51; Publisher: Journal of Food Engineering; Published in: US.

N.C. Shilton, et al., "Determination of the Thermal Diffusivity of Ground Beef Patties Under Infrared Radiation Oven-Shelf Cooking"; Mar. 2002; pp. 39-45 (Abstract Only), vol. 52, No. 1; Publisher: Journal of Food Engineering; Published in: US.

(56) References Cited

OTHER PUBLICATIONS

N. Shilton, et al., "Modeling of Heat Transfer and Evaporate Mass Losses During the Cooking of Beef Patties Using Far-Infrared Radiation"; 2002; pp. 217-222 (Abstract Only), vol. 55, No. 3; Publisher: Journal of Food Engineering; Published in: US.

Y. Takahashi, et al., "Impact of IR Broiling onthe Thiamin and Riboflavin Retention and Sensory Quality of Salmon Steaks for Foodservice Use"; 1987; pp. 4-6 (Abstract Only), vol. 52, No. 1; Publisher: Journal of Food Science; Published in: US.

PCT/US2014/042533; International Search Report and Written Opinion; dated Nov. 4, 2014; Applicant: W.C. Bradley Co.; Published in: WO.

U.S. Appl. No. 14/305,490; "High Efficiency Apparatus and Method for Cooking, Heating and Drying"; First Named Inventor: Mallik Ahmed; filed Jun. 16, 2014.

Extended European Search Report; dated Mar. 30, 2017; European Patent Office; Europe.

OUTDOOR COOKER AND SMOKER, AND FUEL COMBUSTOR THEREFOR

CROSS-REFERENCE TO RELATED CASES

This application is a divisional of co-pending U.S. patent application Ser. No. 14/305,718, filed Jun. 16, 2014, which claims the benefit of U.S. Provisional Patent Application No. 61/835,737, filed on Jun. 17, 2013, the disclosures of which are incorporated by reference as if fully set out at this point.

FIELD OF THE INVENTION

The present invention relates to apparatuses and methods for outdoor cooking and smoking, and to combustion assemblies therefor for combusting charcoal, wood, or other solid fuels to produce heat and smoke.

BACKGROUND OF THE INVENTION

It is well known that most outdoor roasters, grills, and smokers sold in the market are not sufficiently energy efficient. In addition, many outdoor cookers and smokers are commonly unable to provide highly consistent levels of control and performance from one use to the next or even during the course of a single cooking operation. An outdoor roaster or grill will also typically be best suited for cooking only certain types and sizes of products within certain temperature ranges and cooking speeds. As a result, the performance of the device will be less than desirable when cooking products of a different size or type (e.g., meat, poultry, vegetables, prepared dishes, etc.) or when cooking at a different speed.

Unfortunately, the solutions to such problems used in indoor cooking systems often do not translate well to outdoor applications. For example, historically, traditional indoor gas or electric ovens were operated by heating the air inside an insulated cooking chamber to a temperature of from about 300° to 400° F. so that the food within the oven was cooked primarily by free convection. However, these traditional indoor systems were known to be very inefficient. Consequently, to provide improved thermal efficiency and faster cooking, electrical fan systems were added to these traditional indoor ovens in order to increase the air velocity within the cooking chamber and to thereby provide a significantly higher convective heat transfer coefficient.

But, the addition of an electrical fan system also increased the cost and the overall complexity of the oven system and, therefore, was not a viable option for most outdoor cookers. Moreover, suitable electrical power sources for operating such systems are frequently not available for outdoor applications. Also, the higher convective heat tends to dry out the food.

Recently, an alternative type of outdoor cooker referred to as a "Radiant Tube Broiler" was disclosed in U.S. Pat. No. 8,227,728. In this device, the outer wall of the cooking tube is heated by gas or electricity so that the food within the tube is cooked primarily by infrared radiant energy emitted from and reflected by the interior wall of the cooking tube. However, although the Radiant Tube Broiler is more efficient than many other outdoor cooking systems, and is also more efficient than the traditional indoor oven described above, it is not more efficient than a convective oven, particularly when the Radiant Tube Broiler is operated by gas heating, because the hot combustion gas produced in the Radiant Tube Broiler is discharged directly to the atmosphere immediately after flowing upwardly along the exterior of the cooking tube.

In addition to the above, a need also exists for an improved combustion assembly which can be used in or with an outdoor cooking and/or smoking apparatus for burning charcoal, wood, or other solid fuel. By way of example, a typical charcoal combustor currently used in the art is constructed in a manner such that a significant amount of excess air flows upwardly through the entire charcoal bed. As a result, not only must all of this excess air be heated, but the flow of air through the charcoal stack causes the entire stack to ignite and burn at once. Consequently, for extended cooking and/or smoking procedures, the charcoal must be frequently reloaded.

The operation of the prior art combustor is therefore both inefficient and inconvenient. Moreover, the heat and smoke produced by the prior art combustor varies a great deal during the cooking and/or smoking process and is, to a significant degree, substantially uncontrolled. When fresh charcoal is reloaded, the flames spread up the stack until the entire bed is on fire and a peak temperature is reached. Then, the heat energy and temperature produced by the combustor steadily decline so that the cooking temperature is significantly lower by the time that the charcoal must again be reloaded.

SUMMARY OF THE INVENTION

The present invention satisfies the needs and alleviates the problems discussed above. In one aspect, there is provided an inventive apparatus for cooking and/or smoking. The inventive cooking and/or smoking apparatus has a housing comprising: an upwardly extending outer wall; an upwardly extending interior wall inside of the outer wall; a cooking and/or smoking chamber which is defined within the interior wall and is at least partially surrounded by the upwardly extending interior wall in a horizontal plane; an upwardly extending intermediate wall between the outer wall and the interior wall; a first upwardly extending flow gap which is formed between the interior wall and the intermediate wall; and a second upwardly extending flow gap which is formed between the intermediate wall and the outer wall.

The inventive cooking and/or smoking apparatus preferably also comprises a fuel burner assembly positioned to deliver a combustion product gas into a lower end portion of the first upwardly extending flow gap. In addition, the first upwardly extending flow gap has an upper end portion which is in fluid communication with an upper end portion of the cooking chamber to deliver the combustion gas into the cooking chamber. Further, a plurality of flow passages are located at a lower end portion of the cooking chamber which place the lower end portion of the cooking chamber in fluid communication with a lower end portion of the second upwardly extending flow gap to deliver the combustion gas into the second flow gap.

In another aspect, there is provided an apparatus for cooking or smoking comprising a housing having: an upwardly extending first wall; an upwardly extending interior wall inside of the first wall; a chamber for cooking or smoking which is defined within the upwardly extending interior wall and is at least partially surrounded by the upwardly extending interior wall in a horizontal plane; an upwardly extending intermediate wall between the upwardly extending first wall and the upwardly extending interior wall; an upwardly extending inner flow gap which is formed between the upwardly extending interior wall and the upwardly extending intermediate wall and which at least partially surrounds the chamber for cooking or smoking in the horizontal plane; an upwardly extending outer flow gap which is formed between the upwardly extending intermediate wall and the upwardly extending first wall and which at least partially surrounds the chamber for cooking or smoking in the horizontal plane; and a flow path defined in the housing for combustion products, wherein the flow path travels through the upwardly extending inner flow gap, the chamber for cooking or smoking, and the upwardly extending outer flow gap.

In another aspect, the apparatus for cooking or smoking preferably also comprises a fuel burner assembly for producing the combustion products. The fuel burner assembly has a discharge for the combustion products which is in fluid communication with a lower end portion of the upwardly extending inner flow gap. The fuel burner assembly preferably comprises: a combustion chamber; an upwardly extending first wall of the burner assembly; an upwardly extending second wall within the first wall of the burner assembly, wherein the upwardly extending second wall surrounds at least most of the combustion chamber in a second horizontal plane; an upwardly extending flow passage formed between the second wall and the first wall of the burner assembly, wherein the upwardly extending flow passage surrounds at least most of the combustion chamber in the horizontal plane; a fuel support element within the combustion chamber; a plurality of flow apertures provided through the upwardly extending second wall which place the combustion chamber in fluid communication with the upwardly extending flow passage; and a delivery path defined in the fuel burner assembly for the combustion products, wherein the delivery path travels through the flow apertures from the combustion chamber into the upwardly extending flow passage, then upwardly through the upwardly extending flow passage, and then into the lower end portion of the upwardly extending inner flow gap of the housing of the apparatus.

In another aspect, there is provided a combustor for an outdoor cooker or smoker. The combustor preferably has a housing which comprises: a fuel combustion chamber within the housing; an upwardly extending first wall; an upwardly extending inner wall within the first wall which surrounds at least most of the fuel combustion chamber in a horizontal plane; and an upwardly extending flow annulus formed between the inner wall and the first wall which surrounds at least most of the fuel combustion chamber in the horizontal plane.

The inventive combustor preferably also comprises: a plurality of air inlet openings in a lower portion of the housing; a support grate for a solid fuel positioned in the housing at an elevation above, equal to, or below an uppermost elevation of the air inlet openings; and a plurality of combustion product gas openings provided through the inner wall which are positioned at an elevation above the air inlet openings to deliver a combustion gas from the combustion chamber into a lower portion of the upwardly extending flow annulus. In order to facilitate the burning of crumpled paper below the support grate to ignite the solid fuel, and to provide better performance, the fuel support grate is preferably positioned in the housing at or above the uppermost elevation of the air inlet openings.

In another aspect, there is provided a combustor for an outdoor cooker or smoker which preferably comprises: a housing having a fuel combustion chamber therein, wherein the housing further comprises an upwardly extending first wall, an upwardly extending inner wall within the first wall which surrounds at least most of the fuel combustion chamber in a horizontal plane, and an upwardly extending flow passage formed between the inner wall and the first wall which surrounds at least most of the fuel combustion chamber in the horizontal plane; a fuel support element within the housing; a plurality of flow apertures provided through the upwardly extending inner wall which place the fuel combustion chamber in fluid communication with the upwardly extending flow passage; and a delivery flow path defined in the housing for combustion products, wherein the delivery flow path travels through the flow apertures from the fuel combustion chamber into the upwardly extending flow passage and then upwardly through the upwardly extending flow passage.

In yet another aspect, there is provided a method of cooking or smoking a food product comprising the steps of: (a) placing the food product in a chamber for cooking or smoking, wherein the chamber for cooking or smoking is at least partially surrounded by an upwardly extending inner wall in a horizontal plane; (b) heating the upwardly extending inner wall by delivering combustion products upwardly through an upwardly extending inner flow gap formed between the upwardly extending inner wall and an upwardly extending second wall positioned outside of the upwardly extending inner wall, wherein the upwardly extending inner flow gap at least partially surrounds the chamber for cooking or smoking in the horizontal plane; (c) delivering the combustion products from an upper end portion of the upwardly extending inner flow gap into an upper end portion of the chamber for cooking or smoking; (d) delivering the combustion products downwardly through the chamber for cooking or smoking; (e) delivering the combustion products from a lower end portion of the chamber for cooking or smoking into a lower end portion of an upwardly extending outer flow gap formed between the upwardly extending second wall and an upwardly extending third wall positioned outside of the upwardly extending second wall, wherein the upwardly extending outer flow gap at least partially surrounds the chamber for cooking or smoking in the horizontal plane; and then (f) delivering the combustion products upwardly through the upwardly extending outer flow gap.

This inventive method preferably also comprises the steps, prior to step (b), of: combusting a fuel in a combustion chamber to produce the combustion products, wherein the combustion chamber is at least partially surrounded in a second horizontal plane by an upwardly extending combustion chamber inner wall; delivering the combustion products from the combustion chamber into an upwardly extending delivery gap formed between the upwardly extending combustion chamber inner wall and an upwardly extending combustion chamber second wall positioned outside of the upwardly extending combustion chamber inner wall, the upwardly extending delivery gap at least partially surrounding the combustion chamber in the second plane; delivering the combustion products upwardly through the upwardly extending delivery gap; and then delivering the combustion products from an upper end portion of the upwardly extending delivery gap into a lower end portion of the upwardly extending inner flow gap.

In another aspect, to provide an increase percentage of convective heat transfer and/or increased browning, the method of cooking or smoking a food product can be modified, for example, to comprise the steps of: (a) placing the food product in a chamber for cooking or smoking, wherein the chamber for cooking or smoking is at least partially surrounded by an upwardly extending inner wall in a horizontal plane; (b) heating the upwardly extending inner wall by delivering a first portion of a combustion product flow upwardly through an upwardly extending inner flow gap formed between the upwardly extending inner wall and an upwardly extending second wall positioned outside of the upwardly extending inner wall, wherein the upwardly extending inner flow gap at least partially surrounds the chamber for cooking or smoking in the horizontal plane; (c) delivering the first portion of the combustion product flow from an upper end portion of the upwardly extending inner flow gap into an upper end portion of the chamber for cooking or smoking; (d) delivering a second portion of the combustion product flow from the upwardly extending inner flow gap into the chamber for cooking or smoking through a plurality of apertures provided through the upwardly extending inner wall; (e) delivering the first and the second portions of the combustion product flow downwardly through the chamber for cooking or smoking; (f) delivering the first and second portions of the combustion product flow as a combined combustion product flow from a lower end portion of the chamber for cooking or smoking into a lower end portion of an upwardly extending outer flow gap formed between the upwardly extending second wall and an upwardly extending third wall positioned outside of the upwardly extending second wall, wherein the upwardly extending outer flow gap at least partially surrounds the chamber for cooking or smoking in the horizontal plane; and then (g) delivering the combined combustion product flow upwardly through the upwardly extending outer flow gap.

In this modified method, the number and size of the apertures provided through the upwardly extending inner wall will preferably be such that the second portion of the combustion product flow will be less than or equal to the first portion of the combustion product flow on a weight basis. More preferably, the second portion of the combustion product flow will not be more than one half of the first portion of the combustion product flow on a weight basis. The apertures can extend entirely around or partially around the chamber for cooking or smoking or can be provided through the upwardly extending inner wall in any other pattern desired.

The inventive cooking and/or smoking apparatus and the inventive combustor provide significant benefits and advantages over the prior art. For example, the inventive cooker/smoker and combustor operate to:
 improve the energy efficiency of the cooking, smoking, and combustion processes to a degree which is both surprising and unexpected;
 significantly improve the consistency, control, and quality of the cooking, smoking, and combustion processes;
 allow the solid fuel combustor to operate for extended periods of up to 4 to 24 hours or more without requiring any reloading, adjustment, or other intervention;
 provide consistent performance over a wide range of cooking temperatures and over a wide range of cooking speeds ranging from slow cooking or slow smoking to rapid cooking; and
 provide consistent performance for cooking or smoking food products of significantly different types (e.g. meats, poultry, fish, vegetables, vegetable dishes, etc.) and of significantly different sizes.

Further aspects, features, and advantages of the present invention will be apparent to those of ordinary skill in the art upon examining the accompanying drawings and upon reading the following Detailed Description of the Preferred Embodiments.

DETAILED DESCRIPTION OF THE PREFERRED EMBODIMENTS

Figure 1:
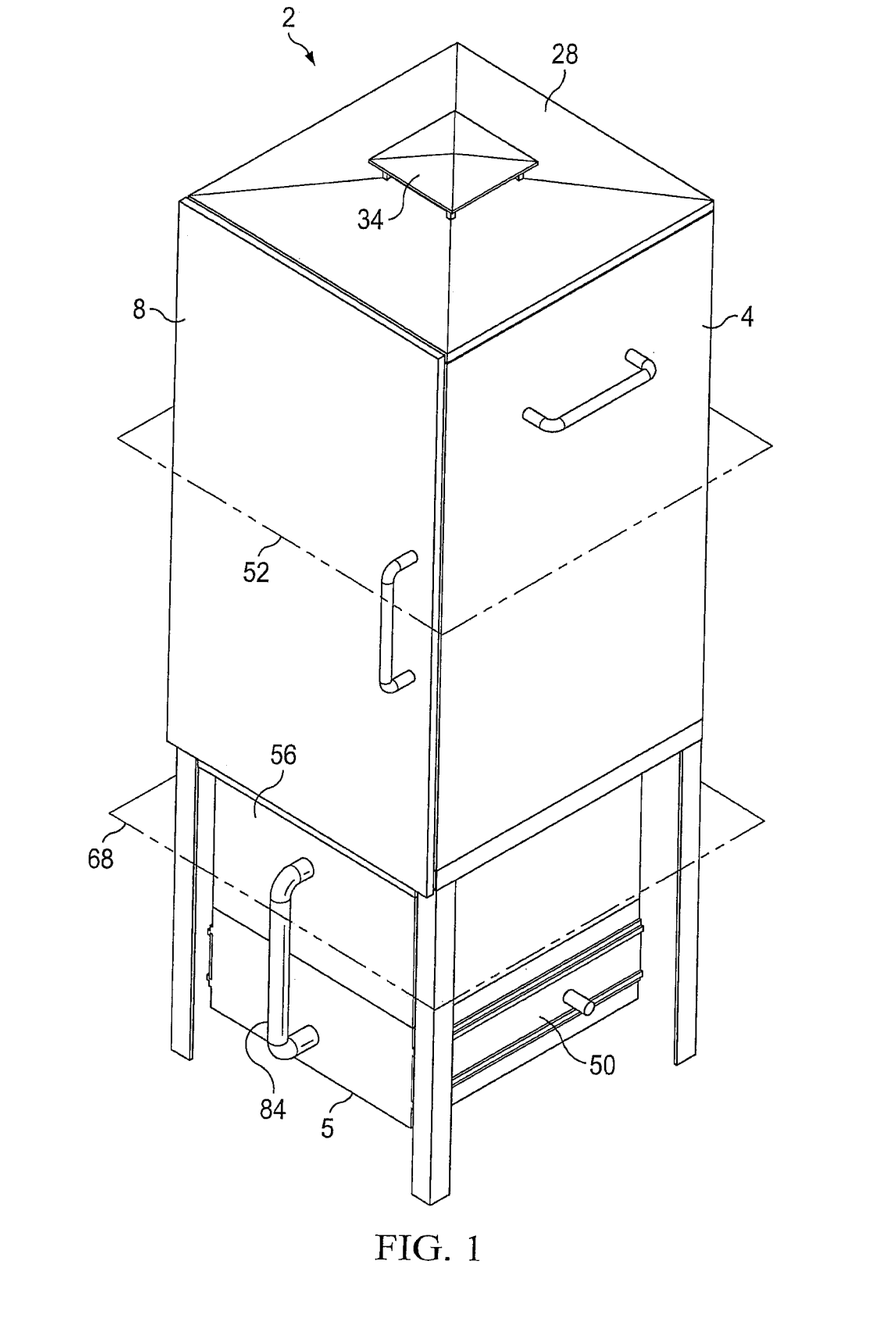
FIG. 1 is a perspective view of an embodiment 2 of the inventive cooking and smoking apparatus. The inventive cooking and smoking apparatus 2 also utilizes an inventive combustor assembly 5 for combusting charcoal, wood, or other solid fuel.
Figure 2:
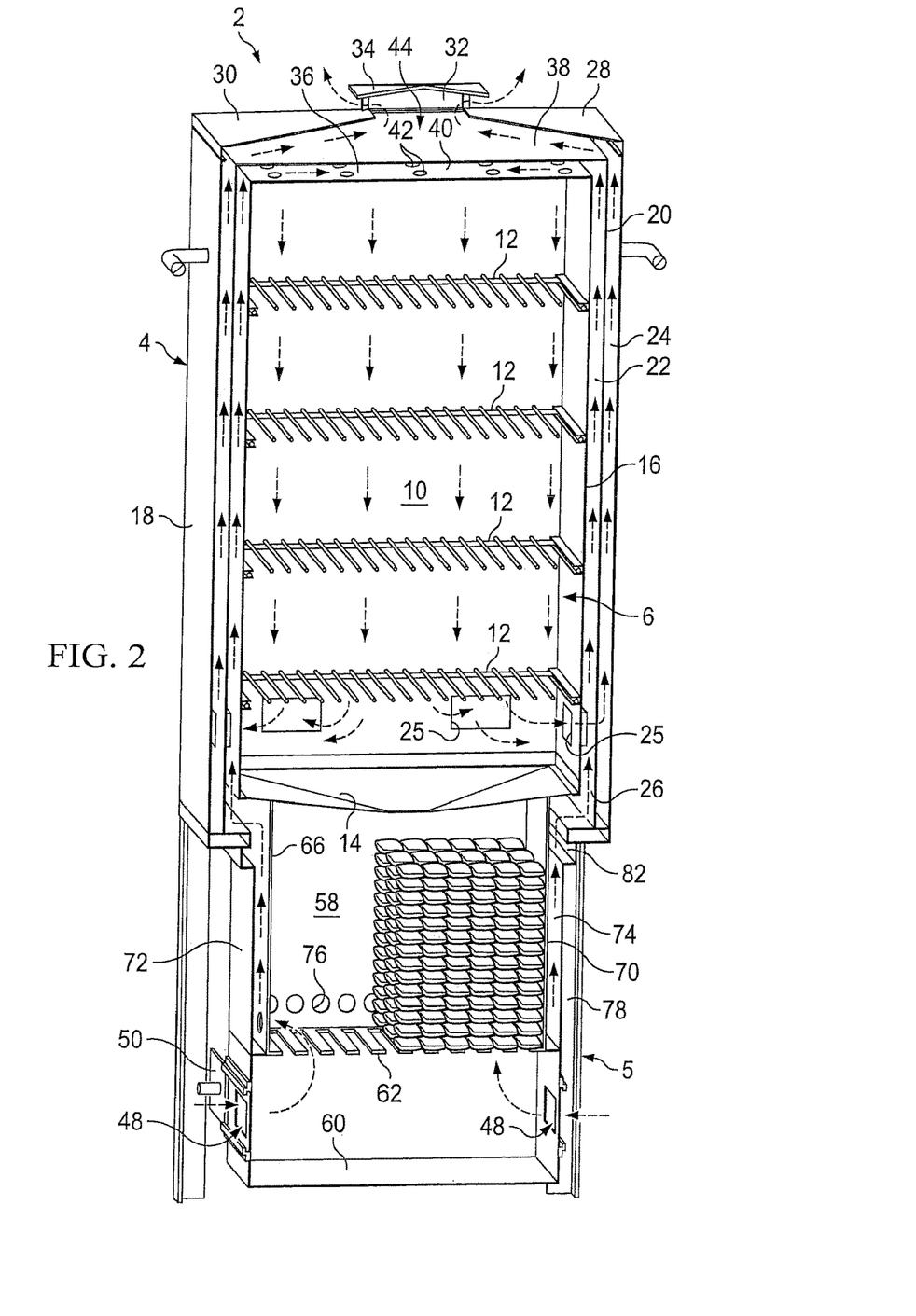
FIG. 2 is a cut-away perspective view of the inventive cooking and smoking apparatus 2.

An embodiment 2 of the cooking and smoking apparatus provided by the present invention is illustrated in FIGS. 1 and 2. The inventive cooking and smoking apparatus 2 is a vertical rectangular unit which comprises: a vertical housing 4 having a cooking and smoking chamber 10 therein, the cooking and smoking chamber 10 having a front opening 6; an inventive solid fuel combustor assembly 5 slideably attached beneath the housing 4; a hinged vertical door 8 for opening and closing the front opening 6 of the cooking and smoking chamber 10; a plurality of a food support racks 12 which are removable positioned within that the cooking and smoking chamber 10; and a grease tray 14 provided in the bottom of the housing 4.

The housing 4 of the cooking and smoking chamber 10 comprises: an vertical interior wall 16 which surrounds the rectangular cooking and smoking chamber 10 on three sides; a vertical exterior wall 18 positioned outside of the interior wall 16; a vertical intermediate wall 20 positioned between the vertical interior and exterior walls 16 and 18; a first (inner) vertical gas flow gap 22 which is formed between the vertical interior wall 16 and the intermediate vertical wall 20 and which surrounds the cooking and smoking chamber 10 on three sides; a second (outer) vertical gas flow gap 24 which is formed between the intermediate vertical wall 20 and the vertical exterior wall 18 and which also surrounds the cooking and smoking chamber 10 on three sides; a connecting flow passageway 26 provided in the bottom of the housing 4 for receiving the hot combustion product gas from the combustor assembly 5 and delivering the hot combustion gas into the lower end of the first (inner) vertical gas flow gap 22; and a plurality of short flow ducts 25 which are positioned in the lower portion of the cooking and smoking chamber 10 and which extend horizontally outward through the interior wall 16, the first vertical gas flow gap 22, and the intermediate wall 20 of the housing 4 to place the lower end portion of the cooking and smoking chamber 10 in fluid communication with the lower end portion of the second (outer) vertical gas flow gap 24 of the housing 4.

The cooking and smoking chamber housing 4 also has a closed top 28 which comprises: a top outer wall 30 having a combustion product gas exhaust opening 32 provided in the center thereof; a raised horizontal rain cover 34 positioned over and spaced apart from the exhaust opening 32; a top horizontal interior wall 36; a top horizontal intermediate wall 38 positioned between the top horizontal interior wall 36 and the top outer wall 30; a top horizontal gas flow passage 40 which is formed between the top horizontal interior wall 36 and the top horizontal intermediate wall 38 and is in fluid communication with the upper end of the first vertical gas flow gap 22 of the housing 4; a plurality of gas flow openings 42 formed in the top horizontal interior wall 36 which place the top horizontal gas flow passage 40 in fluid communication with the upper end of the cooking and or smoking a chamber 10; and an upper gas discharge passage 44 which is formed between in the top horizontal intermediate wall 38 and the top outer wall 30 and is in fluid communication with the with the upper end of the second vertical gas flow gap 24 of the housing 4.

During operation, the hot combustion product gas produced in the combustor assembly 5 flows through the connecting flow passage 26 in the bottom of the cooking and smoking chamber housing 4 and then into the lower end of the first (inner) vertical gas flow gap 22. As the hot combustion product gas flows upwardly through the first vertical flow gap 22, it heats the outer surface of the vertical interior wall 16 of the cooking and smoking chamber housing 4 so that infrared radiant energy is emitted from the inner surface of the vertical interior wall 16 into the cooking and smoking chamber 10. The hot combustion product gas then flows out of the upper end of the first vertical gas flow gap 22 and into the top horizontal gas flow passage 40. Next, the gas is delivered via the gas flow openings 42 in the top horizontal interior wall 36 into the upper end of the cooking and smoking chamber 10.

Subsequently, the combustion product gas flows downwardly through the cooking and smoking chamber 10, wherein it contacts the food products placed on the food racks 12. The combustion product gas then flows outwardly through the flow ducts 25 located in the bottom of the cooking and smoking chamber 10 and into the lower end of the second (outer) vertical gas flow gap 24 of the housing 4. As the combustion product gas then flows upwardly through the second vertical gas flow gap 24, it increases the operating temperature of the housing intermediate wall 20. Finally, when the combustion product gas reaches the upper end of the second vertical gas flow gap 24, the combustion product gas is discharged to the atmosphere via the upper discharge passage 44 and the top exhaust opening 32.

The flow of the combustion product gas upwardly through the first vertical gas flow gap 22, downwardly through the cooking and smoking chamber 10, and then upwardly through the second vertical gas flow gap 24 operates to extract significantly more heat from the combustion product gas as compared to the radiant tube broiler of U.S. Pat. No. 8,227,728 and as compared to other prior art systems. This is achieved in the inventive apparatus 2 by (a) retaining the combustion product gas in the apparatus 2 for a significantly longer period of time and (b) heating not only the outer surface of the vertical interior wall 16 surrounding the cooking and smoking chamber 10, but also warming the intermediate wall 20 and directly contacting and heating the food product in the cooking and smoking chamber 10.

Moreover, the operational heat recovery and efficiency of the inventive cooking and smoking apparatus 2 are further enhanced by the intentional selection and combination of the upward and downward flow paths of the combustion product gas through the first vertical gas flow gap 22, the cooking and smoking chamber 10, and the second vertical gas flow gap 24. As the hot combustion product gas flows upwardly through the first vertical gas flow gap 22, it is traveling in classic counter-current heat exchange relationship with the cooler combustion gas flowing downwardly through the cooking and smoking chamber 10, thus increasing the transfer of heat into the cooking and smoking chamber 10. However, the upward flow of the hot combustion product gas through the first (inner) vertical gas flow gap 22 is in parallel relationship with the upward flow of the cooler combustion gas traveling through the second (outer) vertical gas flow gap 24 so that the outward transmission (i.e., loss) of heat from the first (inner) vertical gas flow gap 22 to the second (outer) vertical gas flow gap 24 is reduced.

In addition, the extended flow path of the combustion gas through the inventive cooking and smoking apparatus 2 increases the backpressure at the air inlet openings 48 of the combustor 5 by an amount sufficient to provide a beneficial reduction in the amount of excess air which flows into the apparatus 2. Also, when needed, further selective control and reduction of the excess air flow into the inventive cooking and smoking apparatus 2 can be provided by adjusting the sliding dampers 50 provided over the combustion air openings 48.

Consequently, whereas the radiant tube broiler apparatus of U.S. Pat. No. 8,277,728 operates within a low heat to high heat range requiring from 2.34 to 4.68 kW of energy, the low heat to high heat range of an inventive apparatus 2 of the same size requires only from 0.29 kW to 1.02 kW.

In addition, the food product prepared in the inventive system 2 retains significantly more moisture than food products cooked in prior art outdoor convective systems. This is because (a) from about 65% to about 75% of the cooking energy transmitted to the food products in the inventive apparatus 2 will be in the form of infrared radiant energy, (b) as a result of having to first heat the vertical interior wall 16 before entering the cooking and smoking chamber 10, the temperature of the combustion product gas in the inventive apparatus 2 will have been reduced to a more desirable level (i.e., typically a low heat to high heat cooking range of from about 200° to about 600° F.) before contacting the food product, and (c) a gentler, lower volume convective flow regime is achieved in the cooking and smoking chamber 10 of the inventive apparatus 2 by reducing both the volume of excess air and the amount of fuel used in the combustion process.

The door 8 of the inventive apparatus 2 can be a solid door which simply closes and seals the front opening 6 of the cooking and smoking a chamber 10. Alternatively, the door 8 can be a hollow structure having an intermediate panel therein which divides the interior of the door 8 into (1) a first (inner) vertical flow passage which, when closed, is in fluid communication with the combustor 5 and/or the first (inner) vertical gas flow gap 22 of the housing 4 and (2) a second (outer) vertical flow passage which is in fluid communication with the cooking and smoking chamber 10 and/or the second (outer) vertical gas flow gap 24 of the housing 4. In this alternative arrangement, the vertical gas flow gaps of the cooking and smoking chamber housing 4 and door 8 substantially entirely surround the cooking and smoking chamber 10 in the horizontal plane 52.

The inventive combustor assembly 5, installed beneath the housing 4 of the cooking and smoking chamber 10, is a solid fuel combustor which can be used for burning charcoal, wood, or other solid fuels. The inventive combustor assembly 5 is particularly well suited for burning charcoal and provides a controlled burn similar to a gas burner.

The combustor assembly 5 comprises: a vertical rectangular housing 56 which is divided into an upper combustion chamber 58 and a lower igniter and ash chamber 60; a horizontal fuel grate 62 within the combustor housing 56 at the bottom of the combustion chamber 58; a plurality of the combustion air inlet openings 48 preferably provided through the side walls of the combustor housing 56 at an elevation which is beneath, at, or above (more preferably at or below) the fuel grate 62; an upwardly extending inner combustion chamber wall 66 which is positioned in the upper portion of the combustor housing 56 and surrounds the upper combustion chamber 58 in the horizontal plane 68; an upwardly extending outer combustion chamber wall 72; an upwardly extending combustion gas flow annulus 74 which is formed between the combustion chamber inner wall 66 and the combustion chamber outer wall 72 and which surrounds the upper combustion chamber 58 in the horizontal plane 68; a plurality of combustion gas flow apertures 76 which are formed through the combustion chamber inner wall 66 at an elevation above the inlet air openings 48 and which place the lower portion of the combustion chamber 58 in fluid communication with the lower portion of the combustion gas flow annulus 74; and a handle 84 for sliding the combustor assembly 5 inward and outward on tracks 82 for (a) loading charcoal or other solid fuel into the combustion chamber 58 through the top of the combustor assembly 5 and then (b) sliding the assembly 5 back into its operating position such that the upper end of the upwardly extending combustion gas flow annulus 74 is in fluid communication with the connecting flow passage 26 provided in the bottom of the cooking and smoking chamber housing 4.

If desired, an additional exterior wall (not shown) can be added outside of the outer wall 72 of the combustion chamber 58 to form an insulating gap which surrounds all or most of the combustion gas flow annulus 74.

In contrast to the prior art charcoal combustors heretofore used in the industry wherein air flows upwardly through the charcoal stack and causes the entire bed to ignite, the inventive combustor provides a controlled burn wherein substantially only a bottom 0.5 to 1.5 inch (preferably about one inch) layer of fuel on the fuel grate 62 is allowed to ignite. In the inventive combustor 5, the upper combustion chamber 58 is substantially closed except for the flow apertures 76 which are preferably located in a lower portion of the combustion chamber 58 at an elevation which is either below, at, or not more than one inch above the fuel grate 62 so that there is insufficient oxygen in the combustion chamber 58 above the flow apertures 76 to allow the higher layers of fuel to ignite.

As the bottom layer of fuel burns and turns to ash, the ash falls through the fuel grate 62, which is preferably a wire grate or other type of open grate, so that the next succeeding layer of fuel moves downwardly onto the grate 62 and is combusted. At the same time, the flow of the very hot combustion product gas upwardly through the combustor flow annulus 74 surrounding the upper combustion chamber 58, as well as the circulation of hot, oxygen deficient combustion product gas within the combustion chamber, operate to preheat the upper layers of fuel to a very high degree so that each succeeding layer of fuel is ready to burn when it reaches the fuel grate 62. The combustion process therefore proceeds in a smooth and substantially steady-state manner throughout the cooking and/or smoking operation.

As noted above, the inventive combustor can provide a consistent, substantially steady-state burn throughout a cooking and/or smoking process of any desired length, ranging from a few minutes up to 24 hours or more, without having to add or reload any additional fuel. The length of the burn time provided by the inventive combustor 5 for any given operation is determined by the height of the fuel stack placed on the fuel grate 62 in the combustion chamber 58 and the relative opening size of the inlet air openings 48. At the same time, the amount and temperature of the combustion product gas produced by the inventive combustor 5 is determined by the horizontal cross-sectional area of the fuel stack. To decrease the operating temperature of the inventive combustor 5, the horizontal cross-sectional size of the fuel stack within the combustion chamber 58 can be decreased, for example, by the provision of internal vertical partitions or baskets (not shown) to provide one or more open (e.g., wire or wire mesh) compartments of smaller cross-sectional size which can be filled to various heights or left unfilled.

Figure 3:
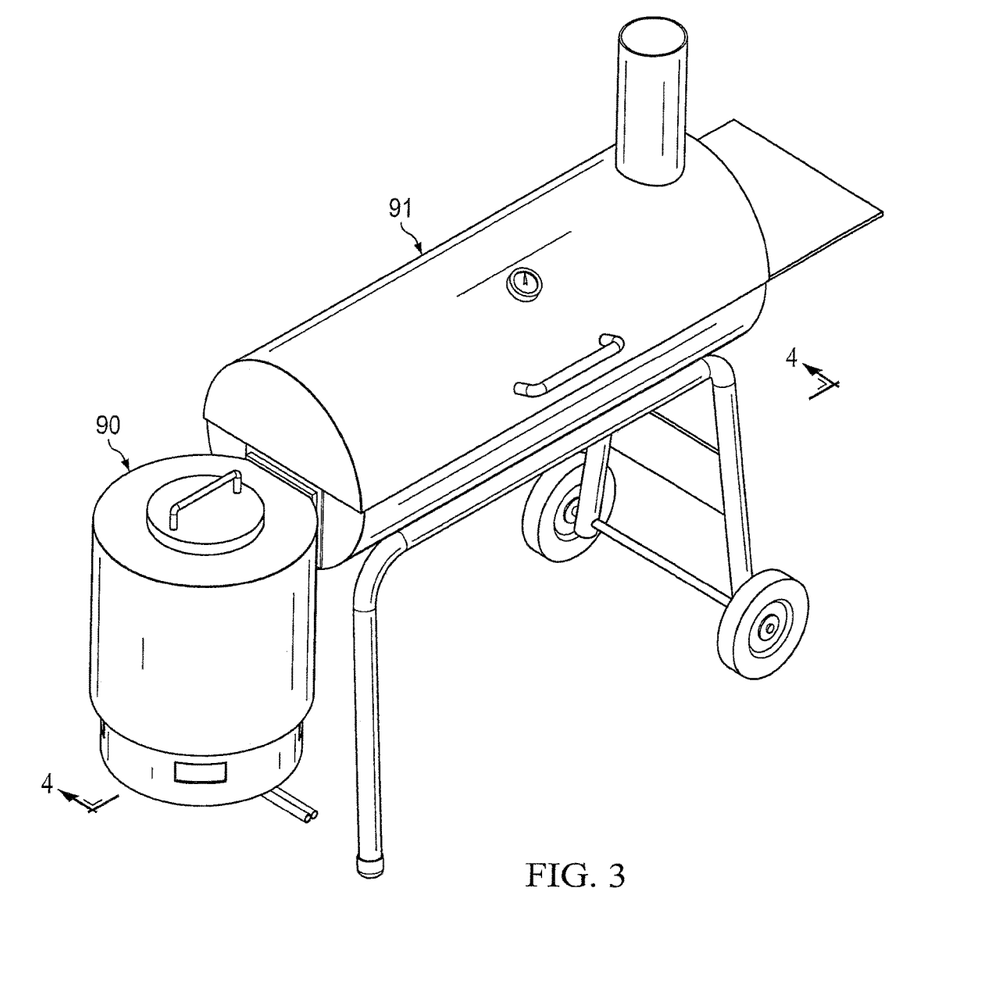
FIG. 3 is a prospective view of an alternative embodiment 75 of the inventive combustor assembly as used in conjunction with a horizontal offset smoker 76.
Figure 4:
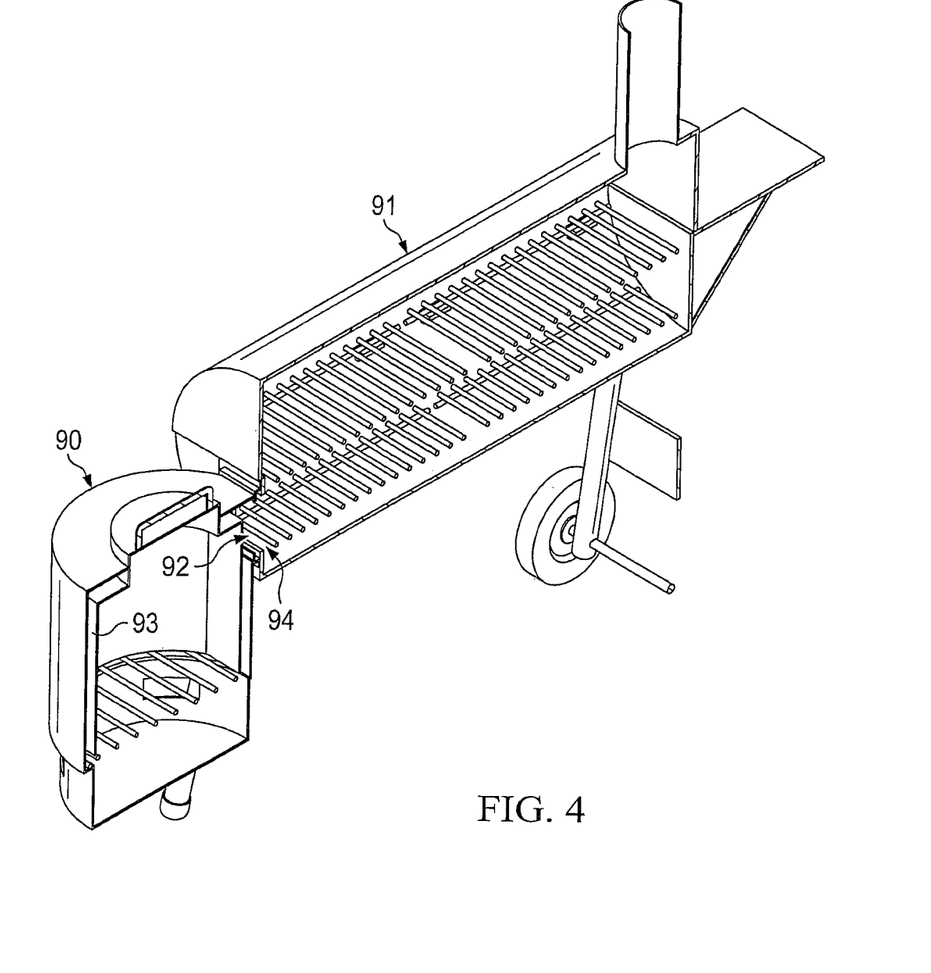
FIG. 4 is a cut-away perspective view of the inventive combustor assembly 75 and the horizontal offset smoker 76.

An alternative embodiment 90 of the inventive combustor assembly used in conjunction with a horizontal offset smoker 91 is illustrated in FIGS. 3 and 4. The inventive combustor assembly 90 is substantially identical to the inventive combustor assembly 5 described above except that the inventive assembly 90 has a circular cross-section and has an upper side opening 92 for delivering the combustion gas from the upwardly extending flow annulus 93 of the combustor 90 into an end opening 94 of the horizontal smoker 91.

When used in conjunction with a prior art charcoal combustor of the type heretofore known in the industry, a horizontal offset smoker 91 of the type illustrated in FIGS. 3 and 4 requires from 8 to 12 pounds of charcoal to cook a 5 to 6 pound chicken. However, when using the inventive combustor 90 illustrated in FIGS. 3 and 4, a chicken of the same size can be cooked in the horizontal offset smoker 91 using only about one pound of charcoal.

Figure 5:
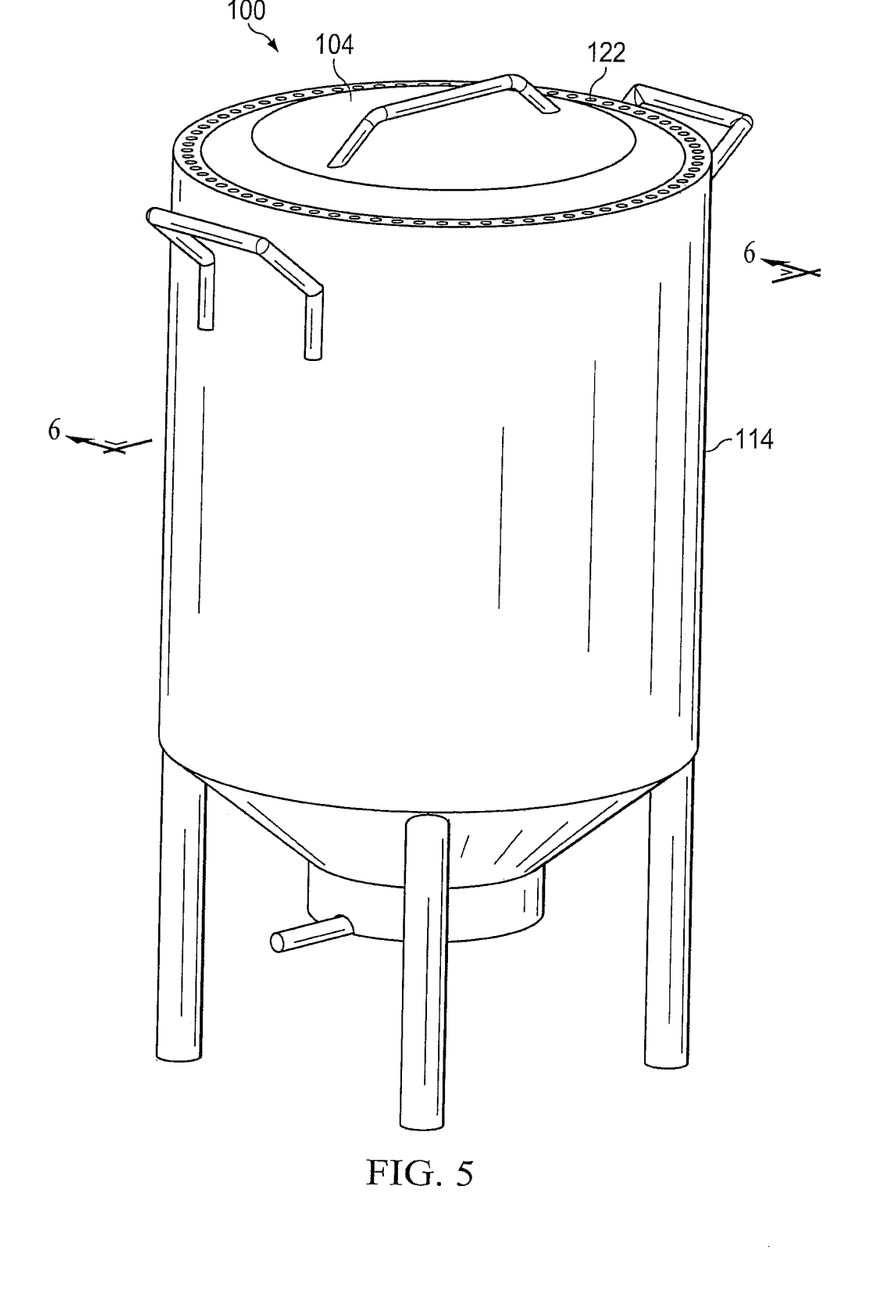
FIG. 5 is a perspective view of an alternative embodiment 100 of the inventive cooking and smoking apparatus.
Figure 6:
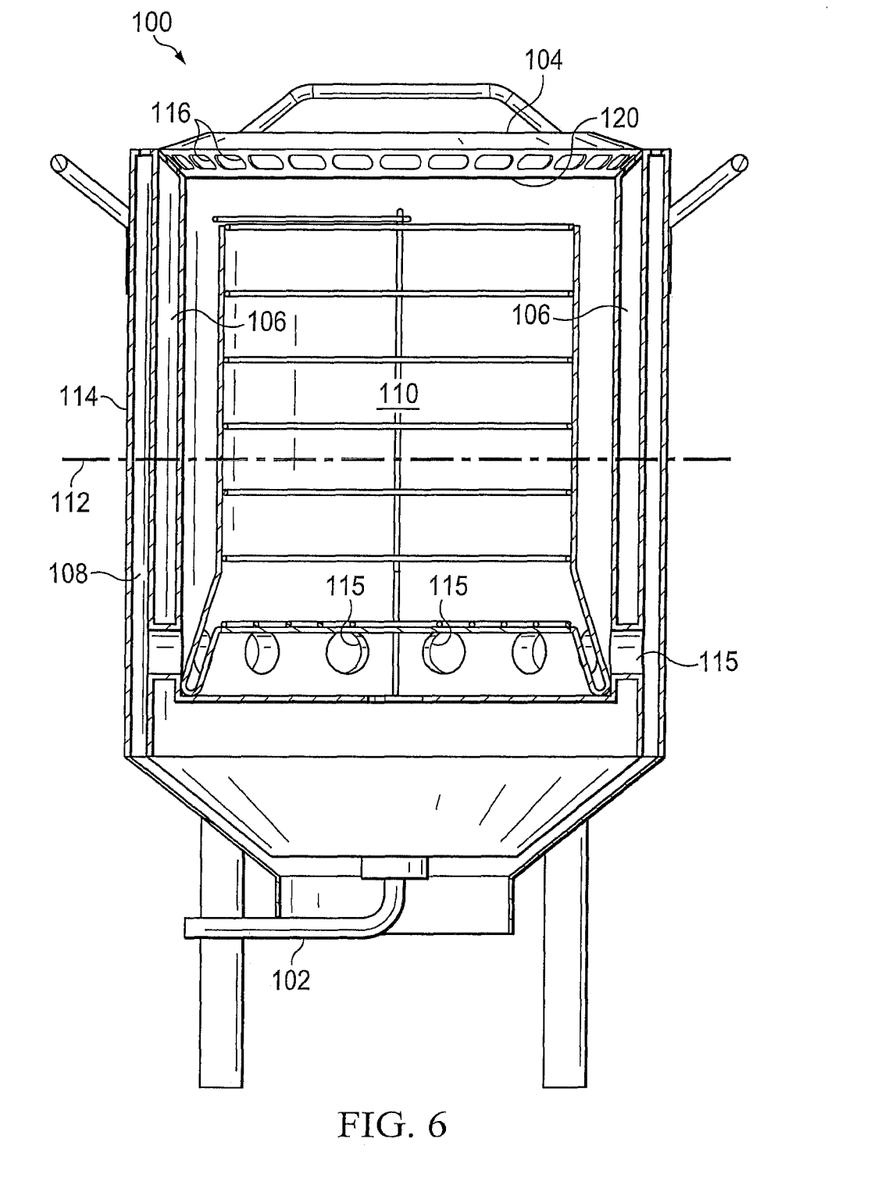
FIG. 6 is a cutaway elevational view of the inventive cooking and smoking apparatus 100.

An alternative vertical embodiment 100 of the inventive cooking and smoking apparatus is illustrated in FIGS. 5 and 6. The inventive cooking and smoking apparatus 100 is substantially identical to the inventive cooking and smoking apparatus 2 depicted in FIGS. 1 and 2 except that (1) the inventive apparatus 100 has a circular cross sectional shape rather than a rectangular cross-section, (2) the inventive apparatus 100 uses a small gas burner assembly 102 rather than a charcoal combustor assembly, (3) the inventive apparatus 100 has a removable cover 104 rather than a vertical front or side door, (4) the cylindrical first (inner) and second (outer) vertical gas flow gaps 106 and 108 of the inventive apparatus 100 entirely surround the internal cooking chamber 110 of the apparatus in the horizontal plane 112, and (5) the series of short, outwardly extending flow ducts 115 which place the cooking chamber 110 in fluid communication with the second (outer) vertical gas flow gap 108 entirely surrounds the lower portion of the cooking chamber 110.

The removable cover 104 is a hollow double-walled lid comprising: (a) a horizontal interior flow passage (not shown) having an encircling array of peripheral openings 116 which place the interior flow passage of the cover in fluid communication with the upper end of the first vertical gas flow gap 106 and (b) a plurality of openings (not shown) in the bottom wall 120 of the lid 104 for delivering the combustion product gas received in the interior flow passage of the lid 104 into the upper end of the cooking and smoking chamber 110. The combustion product gas is ultimately exhausted to the atmosphere via a circular array of exhaust openings 122 provided in the top of the apparatus housing 114 over the circular upper end of the second (outer) vertical gas flow gap 108.

Figure 7:
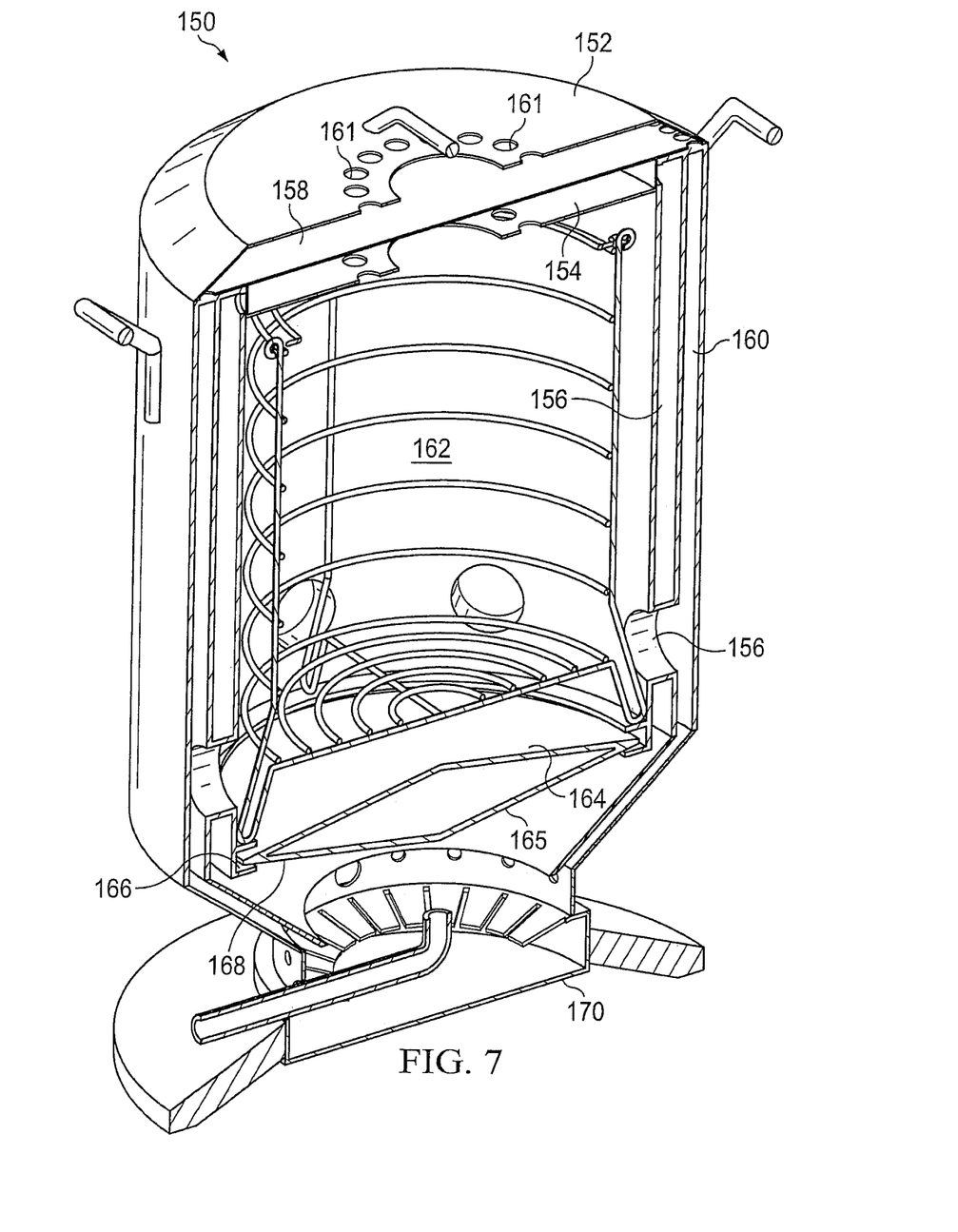
FIG. 7 is a cutaway elevational perspective view of another alternative embodiment 150 of the inventive cooking and smoking apparatus.

Another alternative embodiment 150 of the inventive cooking and smoking apparatus is illustrated in FIG. 7. The inventive apparatus 150 is substantially identical to the inventive apparatus 100 except that the removable cover 152 of the inventive apparatus 150 is a 3-walled lid having (1) a first horizontal combustion product gas flow passage 154 which is in fluid communication with the upper end of the first (inner) vertical gas flow gap 156, (2) a second horizontal combustion product gas flow passage 158 which is in fluid communication with the upper end of the second (outer) vertical gas flow gap 160, and (3) a plurality of exhaust openings 161 in the top of the lid for exhausting the combustion product gas from the upper end of the inventive apparatus 150 (i.e., from the second horizontal combustion product gas flow passage 158) in a manner similar to the inventive apparatus 2 illustrated in FIGS. 1 and 2.

In addition, a double-walled bottom 165 is provided in the cylindrical cooking and smoking chamber 162 of the inventive apparatus 150 which comprises (a) an upwardly projecting cone-shaped top wall 164 which causes hot grease drippings within the apparatus to flow to the peripheral edge 166 of the bottom structure 165 and (b) a bottom wall 168 which is spaced apart from the central portion of the cone-shaped top wall 164 to shield the top wall 164 from the burner flame such that the top wall 164 is prevented from reaching the ignition temperature of the grease. The hot grease which runs to the peripheral edge 166 of the bottom structure 165 drains from beneath the unsealed contact surface of the peripheral edge 166 onto a grease tray 170 in the bottom of the apparatus 150.

Figure 8:
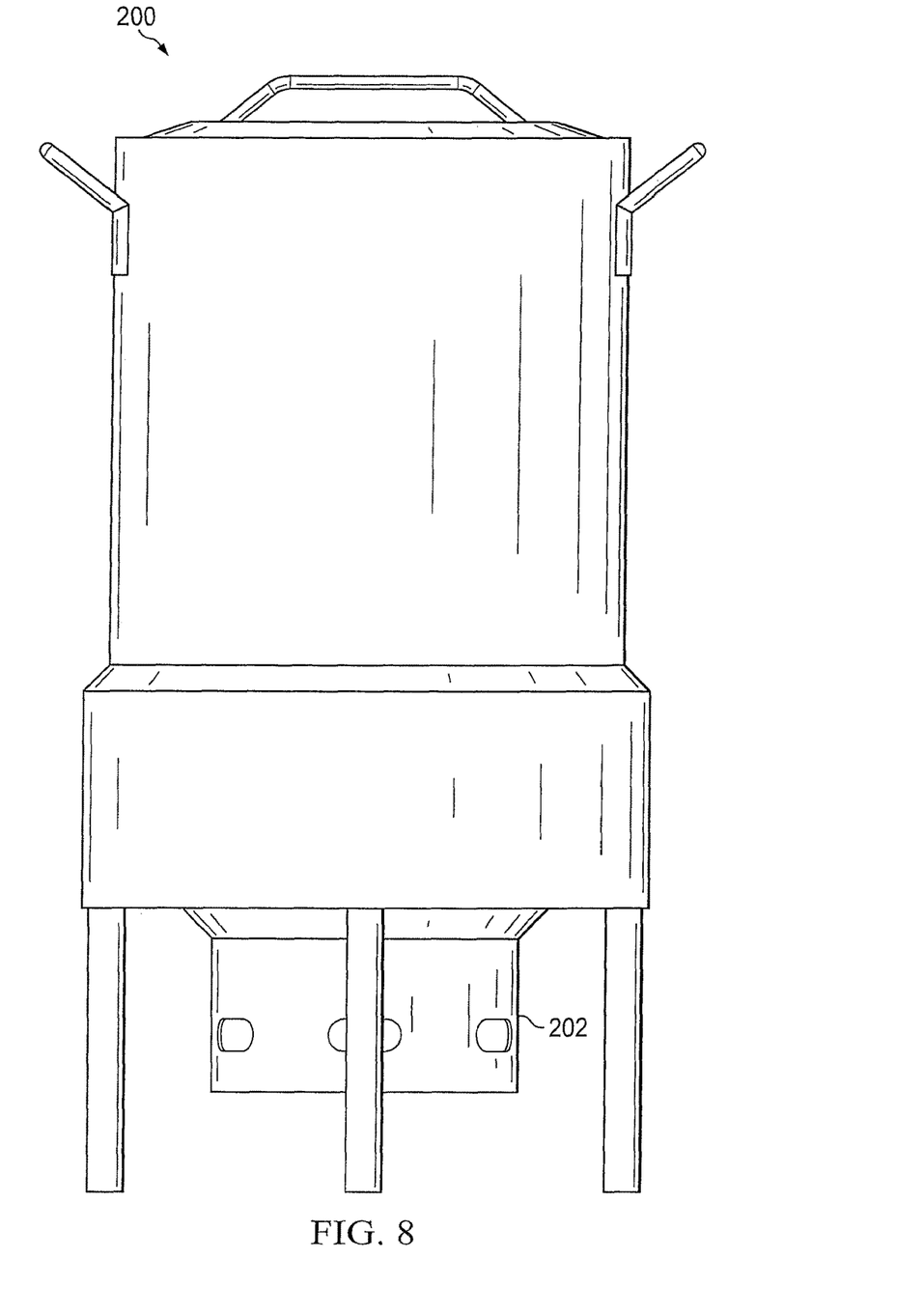
FIG. 8 is an elevational front view of another alternative embodiment 200 of the inventive cooking and smoking apparatus.
Figure 9:
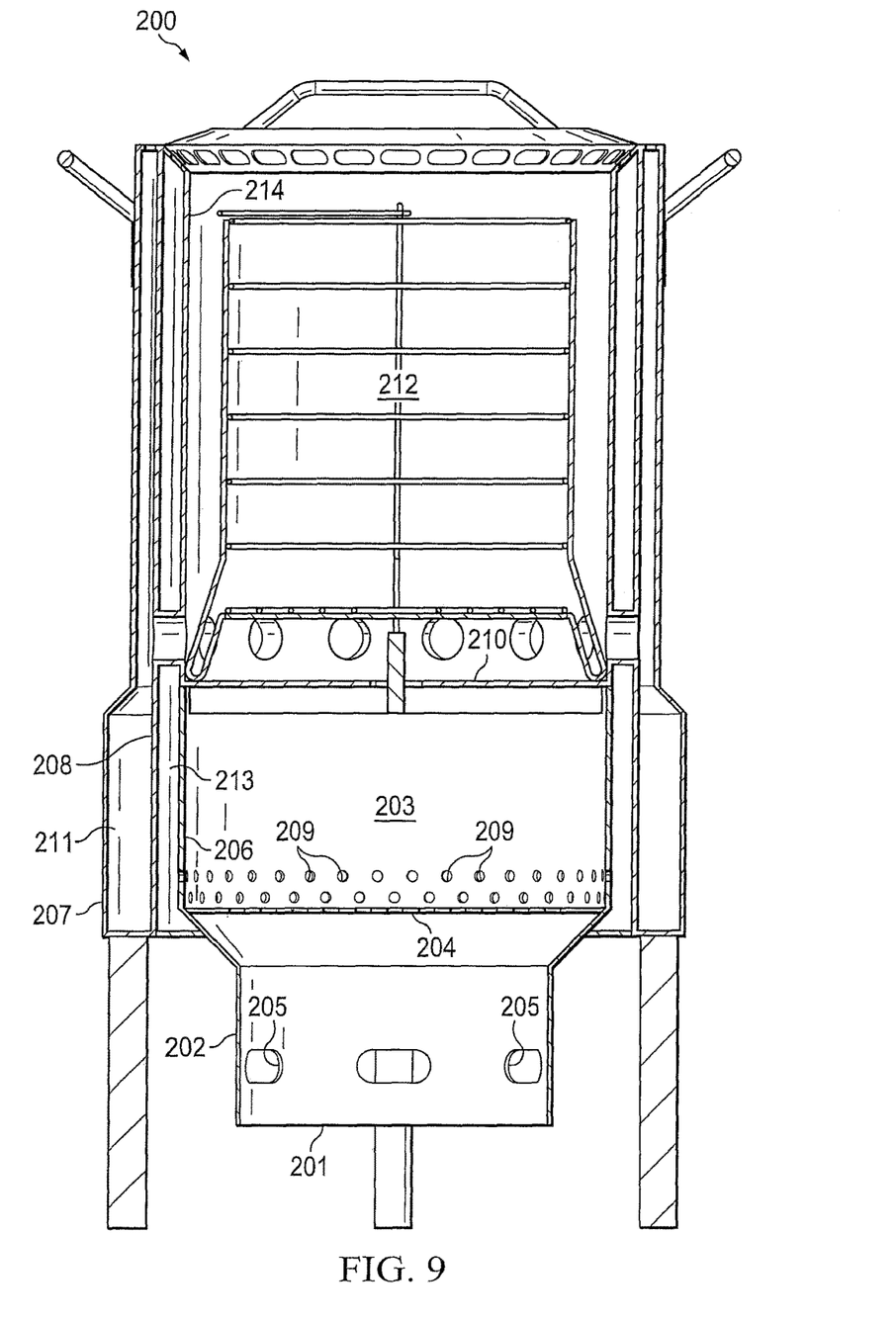
FIG. 9 is a cut-away elevational front view of the inventive cooking and smoking apparatus of 200.

Another alternative embodiment 200 of the inventive cooking and smoking assembly is illustrated in FIGS. 8 and 9. The inventive apparatus 200 is substantially identical to the inventive apparatus 100 illustrated in FIGS. 5 and 6 except that the inventive apparatus of 200 uses a round embodiment 202 of the inventive solid fuel combustor assembly rather than a gas burner. The combustor assembly 202 comprises: a lower igniter and ash assembly 201; an upper combustion chamber 203; a horizontal fuel grate 204 at the bottom of the upper combustion chamber 203; a plurality of the combustion air inlet openings 205 provided through the side walls of the lower igniter and ash assembly 201 below the fuel grate 204; an upwardly extending inner wall 206 of the upper combustion chamber 203; an upwardly extending intermediate wall 208; and upwardly extending outer wall 207. There is also a fixed or removable top 210 for the upper combustion chamber 203.

A plurality of combustion product gas flow apertures 209 formed in the inner wall 206 of the combustion chamber 203 place the lower portion of the combustion chamber 203 in fluid communication with an upwardly extending gas flow annulus 213 formed between the inner wall 206 and the intermediate wall 208 surrounding the combustion chamber 203. The gas flow annulus 213 surrounding the combustion chamber 203 delivers the combustion product gas into the lower end of the inner combustion gas flow annulus 214 which surrounds the upper cooking and smoking chamber 212. Also, there is optionally an insulating gap annulus 211 formed between the intermediate wall 208 and the outer wall 207 of the combustion chamber 203.

It will be appreciated that the function of the device 200 so constructed will be equivalent to the function of the embodiment 2 of the inventive device as shown in FIGS. 1 and 2 relative to the combustion of charcoal but will be equivalent to the function of the embodiment 100 of the inventive device shown in FIGS. 5 and 6 relative to the cooking and heating of items inside the cooking and smoking chamber 212.

The inventive apparatus 200 can cook a 5 pound chicken using only about 1-2 pounds of charcoal. Moreover, the inventive apparatus 200 (a) can cook very fast at a rate of about 15 minutes per pound, (b) can cook slowly for around 8 hours as is typical in an offset charcoal smoker, or (c) can cook a brisket or other large product overnight for 12-16 hours or even up to 24 hours.

It will also be understood by those in the art that each of the inventive cooking and smoking apparatuses 2, 100, 150, and 200 can include any type of desired operating and control system gauges, instruments, sensors, manual controls, automatic controls, etc. known in the art for: monitoring temperatures within the cooking and smoking chamber and/or at any other desired location within the unit; monitoring product temperatures; setting, adjusting, and/or controlling temperatures or combustion or fuel rates; igniting the combustor or burner, etc.

The following examples are meant to illustrate, but in no way limit, the claimed invention.

Example 1

A comparative analysis of the inventive gas-fired cooking and smoking apparatus 150 (FIG. 7) versus a prior art vertical, gas-fired Radiant Tube Broiler as shown and described in U.S. Pat. No. 8,227,728 is performed using a Computational Fluid Dynamics (CFD) simulation program. In this simulation, the inventive cooking and smoking apparatus 150 and the prior art radiant tube broiler each have a cylindrical cooking chamber measuring 14 inches in height and 12 inches in diameter. In each unit, the inner-most cylindrical radiating wall surrounding the cooking chamber is formed of oxidized steel having an emissivity of 0.5.

To obtain an average temperature of 609° F. in the cooking chamber of the prior art Radiant Tube Broiler, a heat input of 18,000 BTU/Hr is required. In comparison, however, when operated at only one third of the heat input required by the prior device (i.e., only 6000 BTU/Hr), the average temperature within the cooking chamber of the inventive cooking and smoking apparatus 150 is 598° F. In addition, temperatures at the hottest and coldest points within the cooking chamber of the prior art device differ by as much as 228° F. whereas the high to low temperature difference within the cooking chamber of the inventive apparatus 150 is only 65° F.

In further contrast to the inventive cooking and smoking apparatus 150, if the prior art Radiant Tube Broiler is operated at a heat input of only 6000 BTU/Hr, the average temperature in the cooking chamber of the prior art device is just 159° F., with a high point to low point temperature range within the prior art device of 83° F.

It is also noted concerning the inventive apparatus 150 that, even at a heat input of just 500 BTU/Hr, the inventive cooking and smoking apparatus 150 provides an average cooking temperature of 165° F. with a high point to low point temperature spread of just 5° F. At a heat input of 1000 BTU/Hr, the average cooking temperature within the inventive apparatus 150 is 233° F. with just a 10° F. spread. At a heat input of 3000 BTU/Hr, the average cooking temperature within the inventive apparatus 150 is 426° F. with only a 27° F. spread.

Example 2

Actual tests were conducted using an inventive cooking and smoking apparatus 150 and a prior art vertical Radiant Tube Broiler having the same dimensions as are assumed in the CFD simulations described in Example 1. The results of these tests confirmed and validated the simulation results set forth in Example 1. Specifically, the average cooking chamber temperature of the prior art Radiant Tube Broiler when operated at a heat input of 16,000 BTU/Hr was 560° F. whereas the average cooking chamber temperature within the inventive apparatus 150 was 610° F. when operated at only 6000 BTU/Hr and 430° F. when operated at only 3000 BTU/Hr.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A combustor for an outdoor cooker or smoker comprising:
    a solid fuel combustion chamber comprising an upwardly extending combustion chamber wall which surrounds at least most of the solid fuel combustion chamber in a horizontal plane;
    an upwardly extending second wall outside of the combustion chamber wall which surrounds at least most of the solid fuel combustion chamber in the horizontal plane;
    an upwardly extending flow passage formed between the upwardly extending combustion chamber wall and the upwardly extending second wall which surrounds at least most of the solid fuel combustion chamber in the horizontal plane;
    an open fuel support grate at a lower end of the solid fuel combustion chamber configured for placing charcoal, wood, or other solid fuel directly on the open fuel support grate;
    an igniter and/or ash chamber below the open fuel support grate, the igniter and/or ash chamber having one or more combustion air openings positioned to deliver combustion air to the charcoal, wood, or other solid fuel on the open fuel support grate; and
    a plurality of flow apertures provided through a lower end portion of the upwardly extending combustion chamber wall which place a lower end portion of the solid fuel combustion chamber in fluid communication with a lower end portion of the upwardly extending flow passage, wherein the flow apertures are provided through only the lower end portion of the combustion chamber wall so that all of a remainder of the solid fuel combustion chamber extending upwardly from the flow apertures is closed and only the lower end portion of the solid fuel combustion chamber is in fluid communication with the upwardly extending flow passage.

2. The combustor of claim 1 wherein the flow apertures are positioned at an elevation which is not more than one inch higher than the open fuel support grate.

3. The combustor of claim 1 further comprising the one or more combustion air openings being positioned at an elevation lower than the open fuel support gate.

4. The combustor of claim 1 wherein the upwardly extending flow passage entirely surrounds the solid fuel combustion chamber in the horizontal plane.

* * * * *